(No Model.)
T. R. CRANE.
FEED DEVICE FOR SEED HOPPERS.
No. 487,720. Patented Dec. 13, 1892.
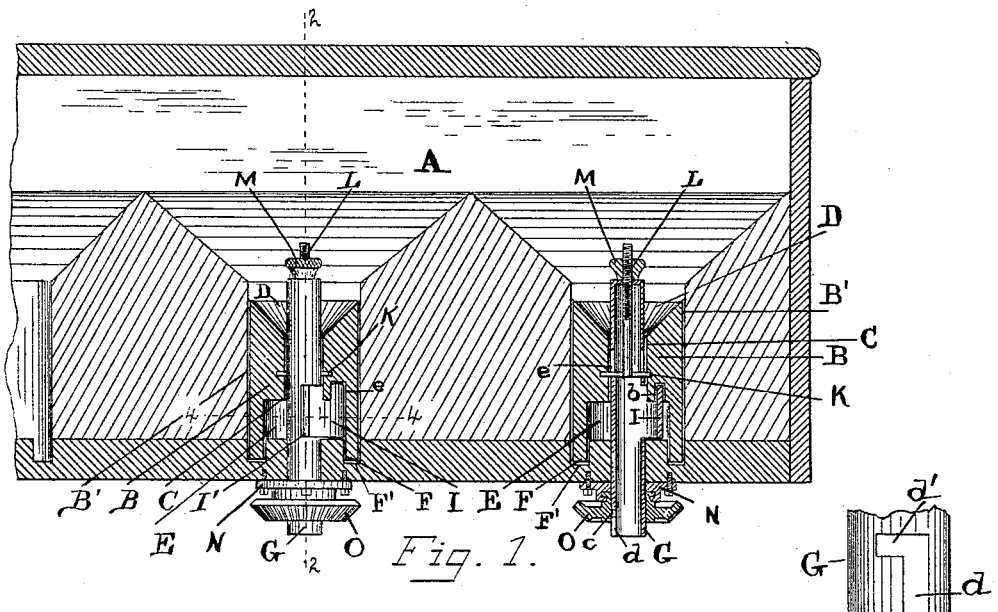
Fig. 1.
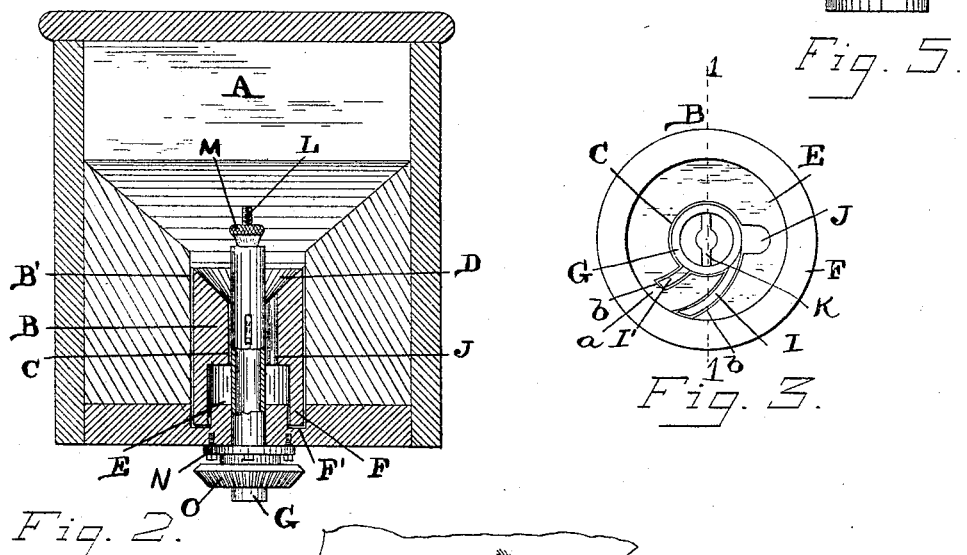
Fig. 2.
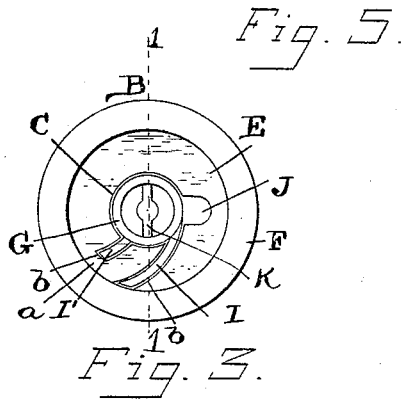
Fig. 5.
Fig. 3.
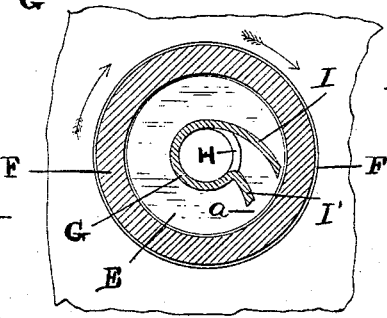
Fig. 4.
Witnesses:
J. C. Mattoon
J. Parker Davis.
Inventor:
Thomas R. Crane,
By Chas. B. Mann
Attorney.
THE NORRIS PETERS CO., PHOTO-LITHO., WASHINGTON, D. C.

UNITED STATES PATENT OFFICE.

THOMAS R. CRANE, OF HEATHSVILLE, VIRGINIA.

FEED DEVICE FOR SEED-HOPPERS.

SPECIFICATION forming part of Letters Patent No. 487,720, dated December 13, 1892.

Application filed March 16, 1892. Serial No. 425,106. (No model.)

*To all whom it may concern:*

Be it known that I, THOMAS R. CRANE, a citizen of the United States, residing at Heathsville, in the county of Northumberland and State of Virginia, have invented certain new and useful Improvements in Feed Devices for Grain and Seed Hoppers, of which the following is a specification.

This invention relates to an improved feed device for grain and seed hoppers of agricultural machines; and the object is to secure a regular uniform feed and avoid crushing the seed by the action of the movable parts, also to arrange for adjusting the parts to feed a greater or smaller quantity.

To this end the invention consists in the novel features of construction and combinations of parts hereinafter described and claimed.

The invention is illustrated in the accompanying drawings, in which—

Figure 1 shows a longitudinal section through a portion of a hopper-box fitted with my improved feed devices, two of such feed devices being shown. In one the central tube is in side elevation, while in the other it is in section. Fig. 2 shows a cross-section of the hopper-box and one of the feed devices. Fig. 3 shows an inverted bottom view of one of the feed devices detached. Fig. 4 shows a horizontal cross-section on line 4 4 of Fig. 1. Fig. 5 shows an enlarged side elevation of the lower part of the central tube.

The letter A designates the hopper-box, which may have any suitable form and is fitted with the desired number of feed devices. Each of such feed devices is constructed as follows: A circular block B fits in a socket B' in the hopper-box, and has a central vertical bore C through it. The upper end of this circular block is turned out conically to form a hopper D, leading down to the said central bore, while the lower end is turned out cylindrically to form a chamber E. The flange F formed about this chamber fits in a circular groove F' in the bottom of the hopper-box. A tube G fits the bore of the circular block and extends down through the bottom of the hopper-box, and also projects upward in the hopper D. This tube where it extends through the chamber E has a side opening H and on one side of the same a curved wing I, whose outer edge is in close proximity to the wall of said chamber. On the opposite side of the opening another similarly-curved wing I' projects. This latter wing is shorter than the other one, and leaves a space $a$ between its outer edge and the wall of the chamber for the passage of grain or seed. Each wing projects upward into a groove $b$, provided for it in the block B. A passage J is made in the block for the grain or seed to feed down from the hopper D into the chamber E.

At the central portion of the block B a key K extends transversely through slots $e$ in the tube G and fastens in the said block. A screw-threaded stem L is secured to this key and passes upward and through the top of the tube, where a knob M is screwed onto it and rests upon the top of the tube.

A suitable bearing N is secured on the under side of the hopper-box bottom for a bevel gear-wheel O, which has a lug $c$ projecting from one side of its central bore. The tube G has a slot $d$ extending upward from its lower end and provided with a lateral part $d'$. The said tube fits through the bore of the bevel gear-wheel, with its lateral slot $d'$ engaged by the lug $c$ on said wheel. The object of this construction is to permit the ready removal of the tube. It will be seen that by turning backward the tube the lug of the gear-wheel may be brought over the vertical part of the slot, and then the tube may be removed by sliding it upward.

The operation is as follows: By means of suitable mechanism rotary motion is imparted to the bevel gear-wheel O, and the tube G and block B will be revolved thereby. The grain or seed in the hopper-box feeds down through the passage J and fills the chamber E. As the parts revolve the grain or seed works past the short wing I' in limited quantity and is directed by the curved wing I into the tube G, through which it drops. It will be seen that this arrangement gives a regular feed, which is governed by the size of the space $a$ between the outer edge of the wing I' and the wall of the chamber E. The feed may be regulated by turning the knob M, which, it will be observed, will raise and lower the block B. This will give a greater or less space for the passage of the grain or seed. The object of having the flange F of the block fitting in a groove in the hopper-box bottom and the wings I I' in grooves in the block, as previously explained, is to permit this adjustment for regulating the feed without disengaging the parts.

With my feeding arrangement the grain or seed will not be crushed by the moving parts, and this makes it specially advantageous for feeding peas and like seed.

Having thus described my invention, what I claim as new, and desire to secure by Letters Patent, is—

1. The combination of the hopper-box containing a circular chamber into which the grain or seed feeds and a rotary tube extending through the said chamber and having a side opening therein with a curved lateral wing at one side of said opening to conduct the grain or seed thereinto and extending to the inner wall of the circular chamber.

2. The combination of the hopper-box containing a circular chamber into which the grain or seed feeds and a rotary tube extending through the said chamber and having a side opening therein, and a curved wing at one side of said opening to conduct the grain or seed thereinto and a shorter wing at the opposite side of the opening, for the purpose described.

3. The combination of the hopper-box, a rotary circular block fitting a socket in said box and having a hopper at its upper end, a chamber at its lower end, and a passage from said hopper to said chamber, and a tube extending through the circular block and the bottom of the hopper-box, said tube having a side opening where it passes through the chamber of the rotary block and a wing at each side of said opening, for the purpose described.

4. The combination of the hopper-box, a rotary circular block fitting a socket in said box and having a hopper at its upper end, a chamber at its lower end, and a passage from said hopper to said chamber and its lower part fitting a groove in the bottom of the hopper-box, a tube extending through the circular block, said tube having a side opening where it passes through the chamber of the block and a wing at each side of said opening, each wing at its upper part fitting a groove in the block, and means for raising the block while the tube remains stationary.

5. The combination of the hopper-box, a rotary circular block fitting a socket in said box and having a hopper at its upper end, a chamber at its lower end, and a passage from said hopper to said chamber and its lower part fitting a groove in the bottom of the hopper-box, a tube extending through the circular block, said tube having a side opening where it passes through the chamber of the block and a wing at each side of said opening, each wing at its upper part fitting a groove in the block, a transverse key extending through slots in the tube and fastening in the block, a threaded stem attached to said key and extending through the top of the tube, and a knob on said stem.

In testimony whereof I affix my signature in the presence of two witnesses.

THOMAS R. CRANE.

Witnesses:
  JNO. T. MADDOX,
  F. PARKER DAVIS.